United States Patent
Panizzolo

(10) Patent No.: US 6,712,170 B2
(45) Date of Patent: Mar. 30, 2004

(54) DEVICE FOR MEASUREMENT AND CONTROL OF THE CONDITIONS OF STABILITY OF A VEHICLE, IN PARTICULAR AN INDUSTRIAL VEHICLE

(75) Inventor: Fabrizio Panizzolo, Padua (IT)

(73) Assignee: Dana Italia S.p.A., Trento (IT)

(*) Notice: Subject to any disclaimer, the term of this patent is extended or adjusted under 35 U.S.C. 154(b) by 0 days.

(21) Appl. No.: 09/891,118

(22) Filed: Jun. 25, 2001

(65) Prior Publication Data
US 2002/0000118 A1 Jan. 3, 2002

(30) Foreign Application Priority Data
Jun. 29, 2000 (IT) ..................... MI2000A1462

(51) Int. Cl.$^7$ ............................. B60K 28/14
(52) U.S. Cl. ..................... 180/283; 180/271
(58) Field of Search ................. 180/271, 283–285

(56) References Cited

U.S. PATENT DOCUMENTS 5,294,191 A * 3/1994 Giorgetti et al. ............ 180/165
6,050,770 A   4/2000 Avitan

FOREIGN PATENT DOCUMENTS

| DE | 10 95 488 | 12/1960 |
|----|-----------|---------|
| DE | 11 60 151 | 12/1963 |
| DE | 37 11 239 | 10/1987 |
| DE | 42 12 839 | 11/1992 |
| EP | 0 312 390 | 4/1989 |
| EP | 0 675 069 | 10/1995 |
| GB | 2 224 982 | 5/1990 |
| PL | 163 932   | 5/1994 |

* cited by examiner

Primary Examiner—Lesley D. Morris
Assistant Examiner—Matthew Luby
(74) Attorney, Agent, or Firm—Hedman & Costigan, P.C.

(57) ABSTRACT

A device for measurement and control of the conditions of stability of a vehicle, in particular an industrial vehicle, comprising at least one load cell (10), which is integrated inside the lower pin of each articulated joint or steering "pivot" (11) of each steering axle (12) of the vehicle, at the level of the wheel hubs (18), so that a structural component of the front and rear steering axle of a four wheel vehicle is a measurement instrument; an electronic control instrument (14), by means of appropriate control software, processes signals (P1–P4), appropriately amplified, transmitted by each load cell (10), so as to calculate the stability of the vehicle in real time and, furthermore, provide a command to disable certain vehicle functions, in the event that the stability values are beyond a certain pre-established safety range.

9 Claims, 3 Drawing Sheets

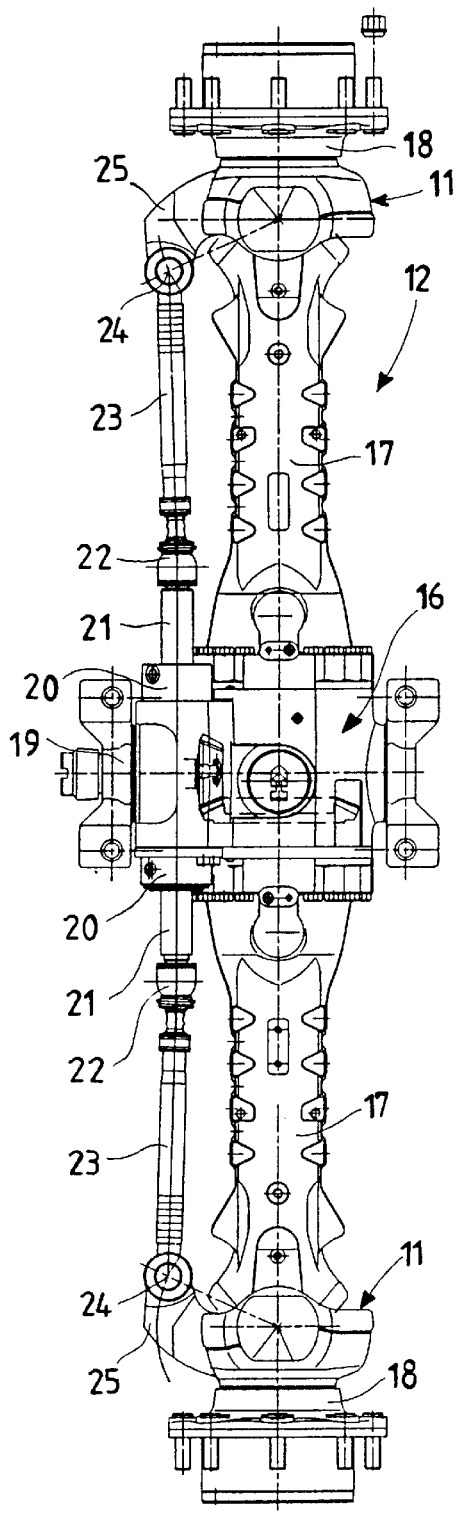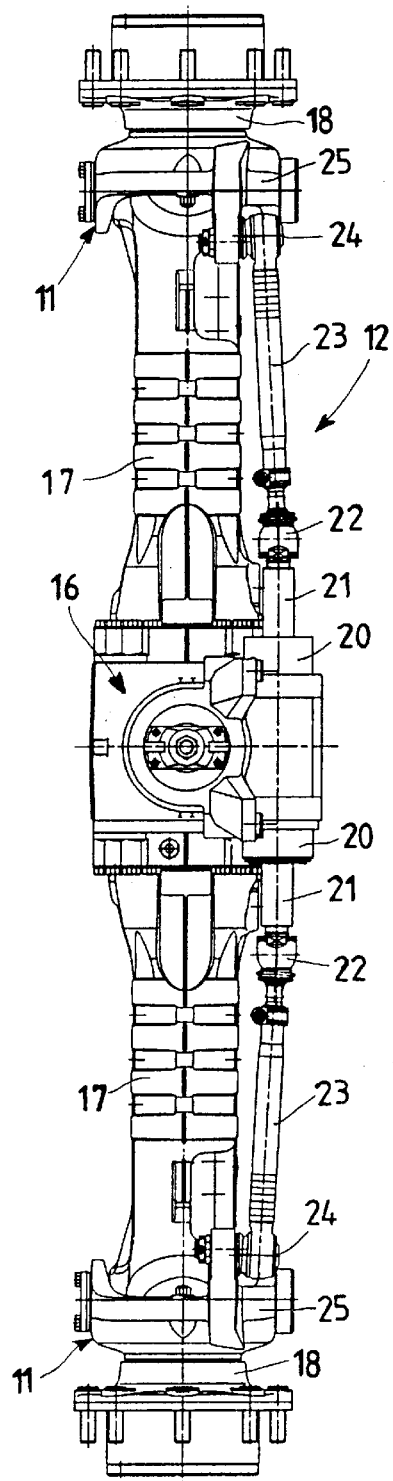

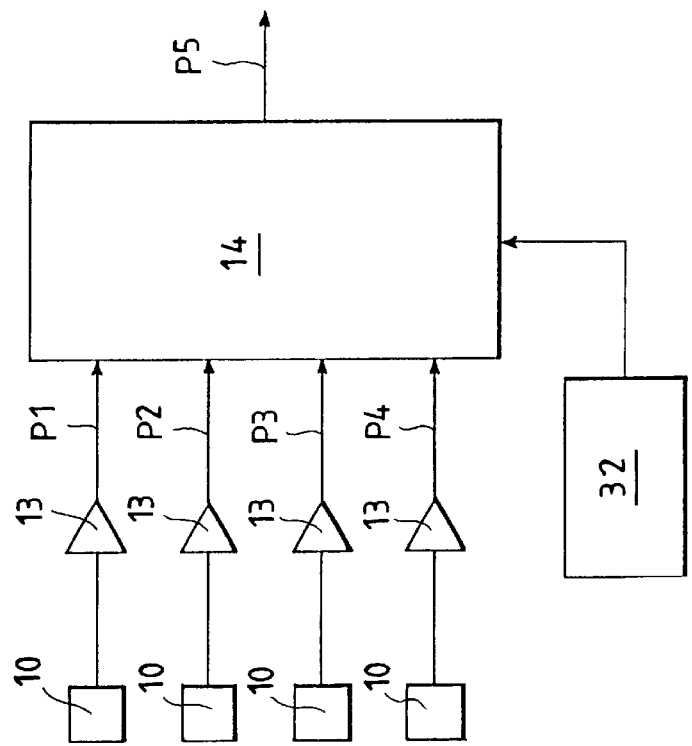
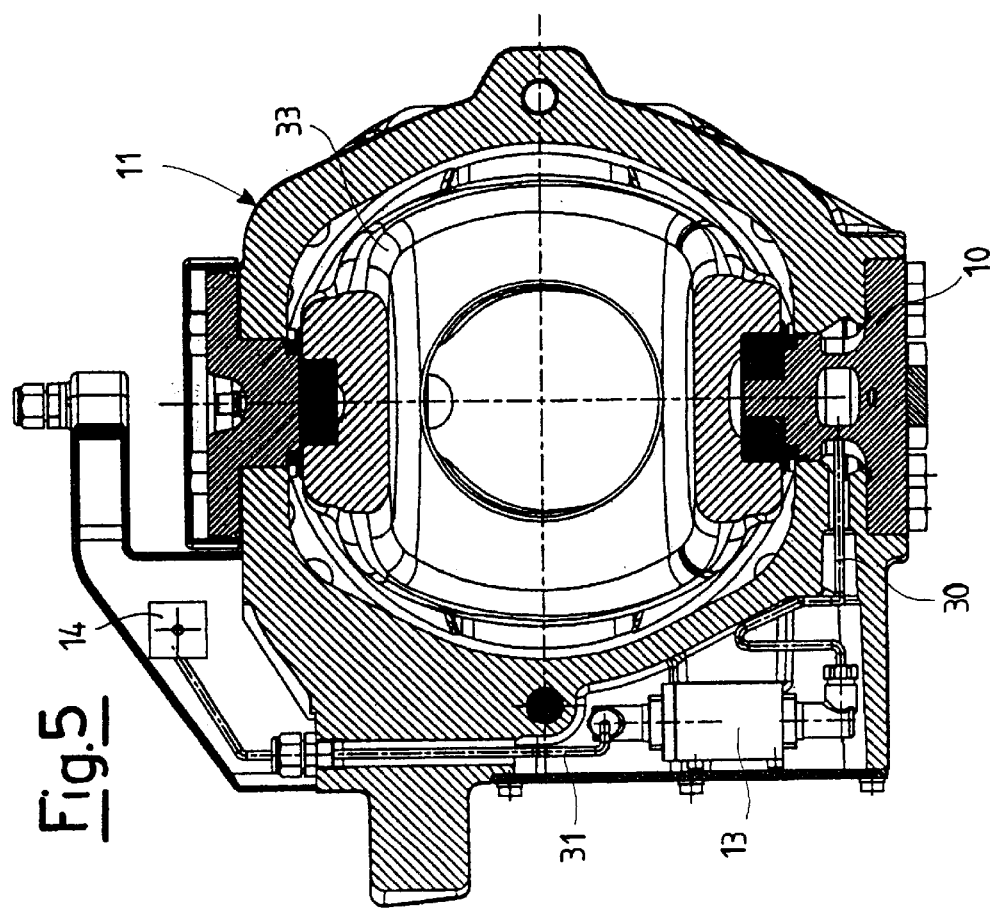

DEVICE FOR MEASUREMENT AND CONTROL OF THE CONDITIONS OF STABILITY OF A VEHICLE, IN PARTICULAR AN INDUSTRIAL VEHICLE

The present invention refers in general to a device to measure and control the conditions of stability of an industrial vehicle and, in particular, a device to measure the forces, in particular the vertical forces, applied to each wheel hub of the two axles to analyse the operating and stability specifications of an industrial lifting vehicle.

A non-limiting preferred example of an embodiment of this invention proposes a device to measure and a system to control the conditions of stability of industrial vehicles, whether static, in movement or during the operating phases to manoeuvre or move the load, if present.

During manoeuvre operations of an industrial vehicle with no suspensions, the entire casing or chassis of the vehicle reacts to the various external stresses, determined by a series of forces and overturning moments, caused either by movement of the load or variation in the stability of the vehicle in motion on the ground.

All this can be performed during static, almost-static or dynamic conditions of use. Measurement of external physical sizes is useful to determine the conditions of operation and stability of the vehicle.

For example, it is possible to measure the vertical forces and overturning moments in the various directions to calculate the stability of industrial vehicles with axles connected to the chassis without interposition of suspensions, during the various manoeuvres of turning, braking, acceleration or lifting the load, in order to calculate the induced forces and the moments of destabilisation of the vehicle. Currently, the operation to measure these forces and moments can be performed using specifically designed measurement instruments, only by simulation to be performed in the laboratory.

Moreover, to date, the various physical sizes of interest are measured approximately and placed in relation to one another by means of force transducers, which are fixed only externally to the casing of the axle or the chassis of the vehicle, thus influenced by all possible effects of disturbance or drift of the signal to be measured, which can be influenced by the effects of temperature, deflections of the system, operating pressures of the brakes, resulting in inaccurate and unreliable final information.

Therefore, fitting these transducers in specific positions of each rotating axle does not permit accurate measurements, as they are influenced by many external factors, in addition to those intrinsic to the geometry of the axle or the coupling of the axle with the vehicle chassis.

Lastly, all this requires the development of complex transformation algorithms, suitable to translate the position through time of each vehicle axle into the fixed coordinates system of the vehicle.

The object of the present invention is, therefore, to solve the problems mentioned above and, in particular, to identify a device for measurement and control of the conditions of stability of a vehicle, in particular an industrial vehicle, which allows an indication of stability to be shown following suitable processing of signals emitted by specific measurement instruments integrated in one or more structural components of the axle.

Another object of the present invention is to produce a device for measurement and control of the conditions of stability of a vehicle, in particular an industrial vehicle, which allows disabling of all manoeuvres that can be controlled by the operator that can cause consequent instabilities of the vehicle.

A further object of the present invention is to produce a device for measurement and control of the conditions of stability of a vehicle, in particular an industrial vehicle, which allows all limit conditions of static instability of the vehicle to be indicated, also in the presence of loads and of straddles for lifting materials, in any operating position of the arm of the vehicle.

Yet another object of the present invention is to produce a device for measurement and control of the conditions of stability of a vehicle, in particular an industrial vehicle, of the automatic type, which is safer and more reliable than traditional indirect measurement and control devices.

These and other objects are achieved by a device for measurement and control of the conditions of stability of a vehicle, in particular an industrial vehicle, as claimed in claim 1, which is referred to for brevity.

Advantageously, the invention refers to the fact that it envisages the integration of one or more transducers and, in particular, one or more directional load cells, on each pin of the articulated joint of the steering "pivot" of the axle, said pin being provided at the level of the supports of the vehicle wheel hubs, thus making a measurement instrument of a structural component of the axle of a four wheel vehicle.

Moreover, the present invention can be advantageously adapted in order to read the stability data continuously, in order to perform, in real time, any type of stability test during operation of the vehicle. The device according to the invention comprises a series of load cells, integrated at the level of the hubs of each axle.

Lastly, an electronic operating device processes, by means of suitable control software, the signals transmitted by each cell, appropriately amplified, in order to calculate the stability of the structure in real time and, therefore, if necessary provide a command to disable specific vehicle functions if the aforesaid processing supplies results with a spatial stability value beyond a certain safety area (base stability area).

This condition of danger can be suitably indicated to the vehicle operator, by means of an acoustic and/or visual warning device positioned on the front of the instrument panel.

The characteristics of the invention shall become clearer from the description below and the annexed drawings, relevant to an example of embodiment given merely as a non-limiting example, in which:

FIG. 1 is a top plan view of an axle connected to the chassis of an industrial vehicle, without the interposition of suspensions, according to the present invention;

FIG. 2 is a side view of the axle in FIG. 1, according to the invention;

FIG. 5 is a part sectional view of the detail in FIG. 4, which shows the integration of a load cell, connected to a signal amplifier, to an articulated joint or steering "pivot" of the axle in FIGS. 1–2, according to the present invention;

FIG. 6 shows a block diagram of the operation of a device for measurement and control of the conditions of stability of a vehicle, in particular an industrial vehicle, according to the invention.

Figure 4:
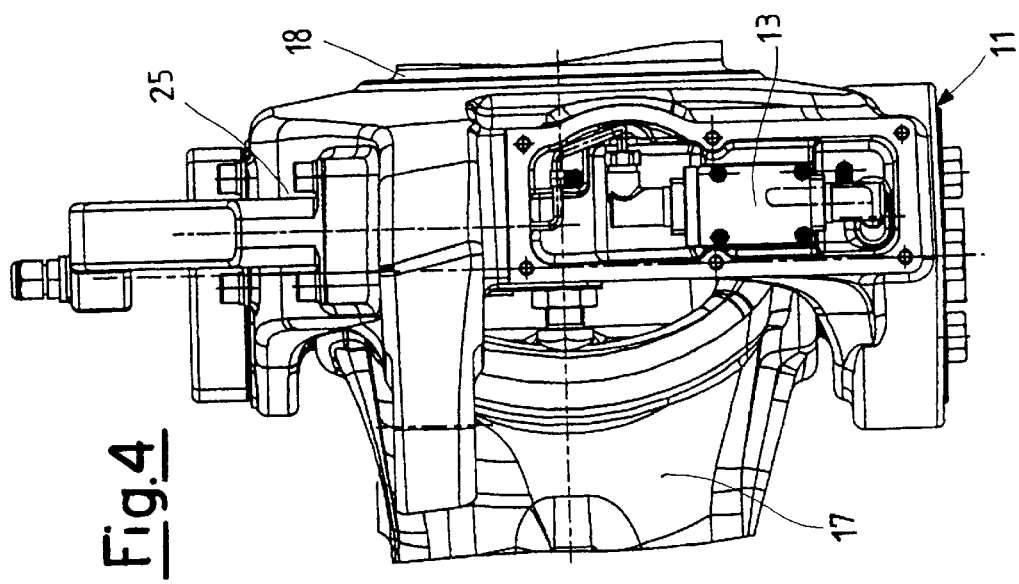
FIG. 4 is an enlarged view of a detail of FIG. 2.
Figure 3:
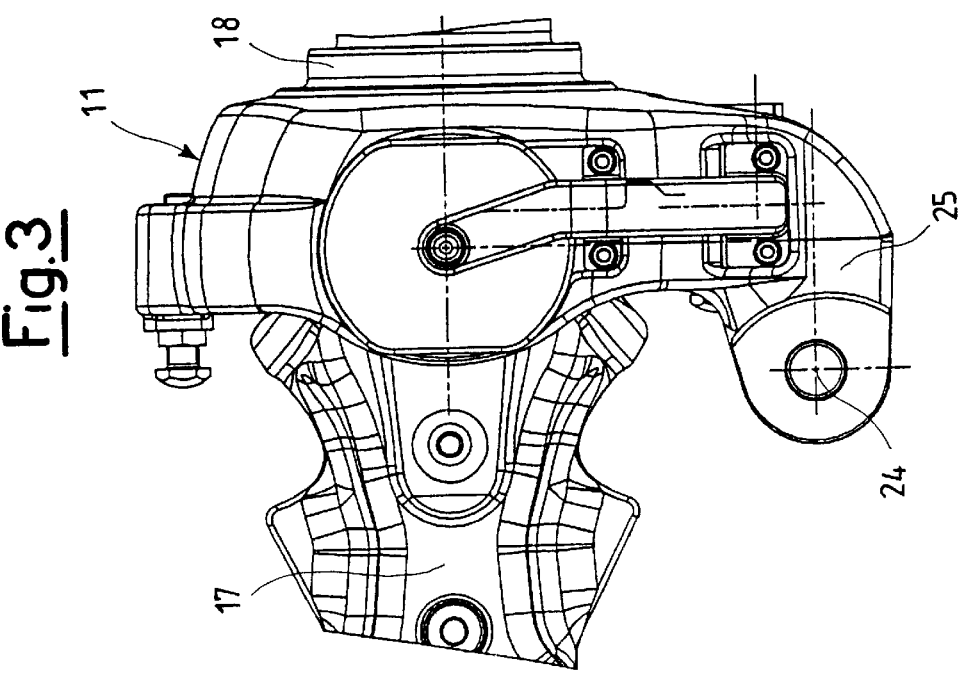
FIG. 3 is an enlarged view of a detail of FIG. 1.

With reference to the aforesaid figures, 12 indicates one of the two axles present in an industrial vehicle, which is provided with a device for measurement and control of the stability, according to the present invention.

In particular, each of the aforesaid axles 12 is connected to the chassis, of the type without the interposition of suspensions, and comprises a central casing 16, from which two arms 17 extend.

Each arm 17, at the level of one of its ends, is provided with a support 33 of the steering pivots 11.

In non-limiting exemplary and preferred forms of embodiment, the axles 12 are of the tractive and steering type.

In relation to this, projecting from the central casing 16 is a flanged shaft 19, which is connected to an engine shaft of the industrial vehicle, by means of a differential, in itself known, which, in turn, operates in rotation two axle shafts integral with rotatable portions of the wheel hubs 18.

The central casing 16 of the axle 12 also supports a steering actuator 20, which is capable of making the rod 21 slide axially.

On both opposite sides, the actuator 20 is connected, by means of ball joints 22, to another rod 23, connected, by means of the ball joint 24, to an appendix 25 of each steering pivot 11.

With specific reference to FIGS. 5–6, 10 indicates each load cell, which is integrated, sealed, inside each pivot or articulated joint 11, while 13 indicates an amplifier of the signal transmitted by the respective cell 10.

The signals taken from the load cells 10 are conveyed along the guide or serial line 30 and from here to the respective amplifiers 13, which are integrated inside the casting of the pivots 11.

The output signals P1–P4 from the amplifiers 13 are conveyed along the guide or line 31 and, subsequently, are processed inside an electronic control instrument 14, which uses an appropriate applications software program to measure the stability of the system in real time and, if necessary, send a series of commands to disable the various functions and controls of the industrial vehicle, if the aforesaid measurement of stability obtained is beyond a certain pre-established area of safety or base stability of the industrial vehicle.

This base stability is calculated by an intelligent self-learning automatic system, which is activated after the system is installed on the vehicle coming off the assembly line.

This automatic system, indicated with 32 in FIG. 6, recognises a series of geometrical data relevant to the chassis of the vehicle, such as the track and the wheel base, the angular position of the lifting arm of the vehicle, if the angular sensor is fitted, and the extension of this arm, calculated by at least one position sensor.

Moreover, the use of a display positioned in the cab and on the instrument panel of each vehicle is envisaged, so that it is available to the operator, and which visualizes an instant condition of stability and a safety limit condition, beyond which conditions of instability of the vehicle are reached.

Basically, the information obtained at the level of load cells 10 and, therefore, the indication of stability, can also be transformed and viewed, by means of suitably arranged applications software, on a display located inside the vehicle cab, either in analog or digital mode.

In a preferred form of embodiment, geometrically represented on the display in question is a stability area inside which, in safe operating conditions, a luminous point is contained; this point represents an instant measurement of the static or dynamic barycentre of the vehicle, in any operating condition.

In the event that this luminous point is subsequently still located inside, although near the limits of, this area of base stability, this condition of potential danger is signalled to the operator in the cab visually (for example, by means of a flashing hazard LED) and/or acoustically (for example, by means of a siren or buzzer).

In addition to these signals, the applications software that governs operation of the instrument 14 allows disabling of a series of manoeuvres, which can be performed by the operator, the actuation of which are contrary to the stability of the entire vehicle.

In particular, a first variable that can be controlled by the operating program of the system is represented by the extension of the lifting arm of the industrial vehicle of this type and by the downwards inclination of the forks fitted to the end of the arm that bear a load.

In this case, on the basis of the limit conditions of stability identified and on the basis of the extent of elongation of the arm, the device according to the invention is capable of recognising the overturning moment of the structure and, therefore, of how much the vertical load of the rear axle 12 decreases.

Therefore, in practice the variables relevant to the extension of the arm and folding of the fork allow a stabilising moment to be calculated and this position to remain locked if the operating functions given are contrary to stability.

Moreover, if the industrial vehicle is not operating on flat ground, the instrument is capable of recognising the limit conditions of lateral instability.

In the event of instability of this nature, the output signal P5 from the electronic control instrument 14 is also used to disable the command to start up the vehicle, acting directly on the transmission and warning the operator by means of an acoustic and/or visual signal in the cab.

Nonetheless, beyond the limit conditions of lateral and longitudinal overturning, in order to prevent the disabling of too many vehicle functions, thus lowering the productivity of the vehicle, it may be advisable to allow the vehicle to proceed in any case, also in the presence of conditions close to the pre-established stability limits, provided that motion limited to the first or second gear can be stopped by the control system in the event of critical conditions occurring.

The device for measurement and control according to the present invention also takes account of any knocks or accelerations on the vehicle axles, which can propagate throughout the entire structure, during operation, caused by deformations or holes found on the work site or caused by dynamic effects of deceleration.

In this case, for example, if the arm of lifting vehicles is extended, operation of the device according to the invention is directed towards retracting this automatically to recover the stability of the entire structure.

In non-limiting exemplary and preferred forms of embodiment of the present invention, load cells 10 are used, the maximum precision of which is 2% below the full scale measurement.

Each dynamometric cell 10 is preferably provided with eight strain gauges with variable electric resistance and with a sensitivity of around 1 mV/V.

Moreover, the four signal amplifiers 13 are fitted, one for each cell 10, in such a way as to avoid all possible disturbance or distortion of the signal, coming from the same load cell 10 and which is thus transmitted to the processing and/or signalling terminal located inside the vehicle cab.

The characteristics of the device for measurement and control of the conditions of stability of a vehicle, in particular an industrial vehicle, which is the subject of the present invention, become more apparent from the description above, as do the advantages.

Lastly, it is apparent that numerous other variants may be implemented to the device in question, without departing from the principles of intrinsic novelty of the invention, just as it is apparent that, in the practical actuation of the invention, the materials, forms and dimensions of the details illustrated may vary according to requirements and these may be substituted with others of technical equivalence.

What is claimed is:

1. Device for measurement and control of the stability of an industrial vehicle having an axle (12) which includes at least one articulated steering element (11), wherein at least one transducer means (10) is integrated inside each articulated steering element (11) of said axle (12) of the vehicle in order to cause at least one of the structural components of said axle (12) of said vehicle to function as a measurement instrument; wherein said measurement instrument includes means to record and process stability data of said vehicle continuously and in real time in order to perform a series of stability calculations during parking and operation of the vehicle; said means to record and process stability data comprising an electronic control instrument (14) which processes, by means of appropriate control software, signals (P1–P4) coming from said transducer means (10) that are amplified by amplifying means (13), said means to record and process further comprising an automatic system (32) which receives geometric data relevant to a configuration of said vehicle including track, wheel base and an angular position of a lifting arm, said angular position being calculated by at least one position sensor located on said lifting arm, in order to calculate a safety stability measurement of said vehicle in real time and supply a command to disable specific functions of the vehicle in the event that said safety stability measurement is beyond a certain range of safety values; said amplifying means being integrated inside the articulated steering element (11).

2. Device for measurement and control as claimed in claim 1, wherein acoustic means and/or visual signals, positioned inside a vehicle cab are signaled to the operator of the vehicle when a preset stability measurement is in a transition zone which is adjacent to or in a predetermined range of unsafe conditions.

3. Device for measurement and control as claimed in claim 1, wherein said transducer means (10) are composed of load cells, which are integrated inside pins of the articulated steering element (11), at opposite ends of each axle (12).

4. Device for measurement and control as claimed in claim 1, wherein each of said axles (12) is directly connected to a part of a chassis of said vehicle without the interposition of suspensions, and comprises a central casing (16), from which two arms (17) extend, each of which being fitted, at each end, with articulated steering couplings (11) which are attached to wheel hubs (18).

5. Device for measurement and control as claimed in claim 1, wherein said safety stability measurement is calculated by an intelligent self-learning automatic system (32), which measures geometrical data relevant to a track and a wheel base of said chassis of said vehicle.

6. Device for measurement and control as claimed in claim 1, wherein a display is, positioned in a cab and on an instrument panel of the vehicle, to provide the operator with an analog or visual display of the instant condition of stability, wherein said visual display comprises a visual representation of limits of stability and a luminous point representing an instantaneous representation of a static or a dynamic barycentre of said vehicle being depicted with reference to said visual representation of limits of stability, to provide real time notice to an operator of how close operation of said vehicle is to said limits of stability.

7. Device for measurement and control as claimed in claim 1, wherein said electronic control instrument (14) is capable of overriding a series of maneuvers by the operator, when said maneuvers are contrary to the static stability of the entire vehicle.

8. Device for measurement and control as claimed in claim 7, wherein if the vehicle is not operating on flat ground, it is capable of recognizing said safety stability measurement and using an output signal (P5) from said electronic control instrument 14 to disable the command to start up the vehicle.

9. The device as in claim 1 wherein said means to record and process stability sends a series of commands to disable functions and controls of said vehicle based upon a real time calculation of said stability of said vehicle based upon data received from said electronic control instrument (14) and base stability data received from said automatic system (32).

* * * * *